United States Patent [19]

Iwamoto

[11] Patent Number: 4,716,994

[45] Date of Patent: Jan. 5, 1988

[54] DISC BRAKE

[75] Inventor: Tadashi Iwamoto, Saitama, Japan

[73] Assignees: Akebono Brake Industry Co., Ltd., Tokyo; Akebono Research and Development Centre Ltd., Saitama, both of Japan

[21] Appl. No.: 896,139

[22] Filed: Aug. 12, 1986

[30] Foreign Application Priority Data

Aug. 16, 1985 [JP] Japan .................. 60-180246
Nov. 5, 1985 [JP] Japan .................. 60-247792

[51] Int. Cl.$^4$ ............................................. F16D 55/46
[52] U.S. Cl. .............................. 188/72.2; 188/73.44; 303/93
[58] Field of Search ............... 188/73.44, 72.2; 303/93

[56] References Cited

U.S. PATENT DOCUMENTS 3,917,032 11/1975 Hoffman .................. 188/73.44
4,296,897 10/1981 Thompson .................. 188/181 T X Primary Examiner—Joseph Falk
Attorney, Agent, or Firm—Toren, McGeady & Associates

[57] ABSTRACT

A disc brake having a rotor, a pair of friction pads which are arranged to be capable of frictionally engaging the revolving faces of the rotor, a caliper which is arranged to straddle a portion of the periphery of the rotor and to incorporate therein a piston-cylinder device which is arranged to cause the pair of friction pads to frictionally engage the revolving faces of the rotor and a support member which carries the caliper in such a way as to have the caliper slidable in the axial direction of the rotor and is arranged to receive a braking torque arising on the friction pads either directly or through the caliper, comprising a fixed support arranged to have the support member carried by and turnable on a pin member which is disposed in parallel with the axis of the rotor and to include anchor parts which engage the support member to limit the turnable degree of the support member on the pin member, and a turning force detector which is disposed on at least one of the anchor parts and is arranged to detect the turning force of the support member.

6 Claims, 4 Drawing Figures

ROTATING DIRECTION OF ROTOR WHEN VEHICLE RUNS FORWARD

DISC BRAKE

BACKGROUND OF THE INVENTION

1. Field of the Invention

This invention relates to a torque sensing type disc brake arranged to permit measurements of a braking torque which represents the output state of a braking device.

2. Description of the Prior Art

A disc brake is arranged, as well known, to brake the rotation of a rotor by causing a pair of friction pads to frictionally engage the revolving faces of the rotor with an input obtained from hydraulic or mechanical input means. Meanwhile, it has been variously arranged to have a braking torque which is applied to the friction pads received by some fixed member of a vehicle (such as a knuckle, a support member or the like) either directly or through a caliper or the like. The details of the disc brakes of this kind have been known, for example, from the specifications of British Patents No. 1500907, No. 1095368, etc.

Further, for ensuring safe brake application to vehicles, the braking devices have been arranged in functional combination, for example, with a proportioning valve for controlling the allocation of braking forces to front and rear wheels in connection with a shift which takes place in the load position during brake application; a booster which boosts the pedalling force of a brake pedal, an antilock device for preventing wheels from falling into a locked state on a frozen road surface or the like, and so on.

With each of four wheels of a vehicle assumed to be equipped with a braking device of the above-stated kind, it is preferable for a safe braking operation on a vehicle to have a feedback control system arranged to detect the output states of these braking devices and to feed back the input control device of each of these braking devices with information on the output state detected. Such feedback arrangement is advantageous for adequate control, for obtaining always a constant braking force in response to a given pedalling force on the brake pedal and for antilock control over the wheels. In actuality, however, there has been known no control system that is capable of directly detecting the output of a braking device, although there has been some known arrangement to detect the rotating state of a wheel, for example, in such a manner as disclosed in the specification of U.S. Pat. No. 3,626,226. The reason for the absence of the above-stated control system resides mainly in the difficulty of measuring and detecting the output of a braking device in the form of a physical quantity with a sufficiently high degree of reproducibility.

SUMMARY OF THE INVENTION

In view of the above-stated difficulty, it is an object of this invention to provide a torque sensing type disc brake which has a structural arrangement suited for measuring and detecting the output of the disc brake in the form of a physical quantity having a sufficiently high degree of reproducibility.

It is another object of this invention to provide a torque sensing type disc brake which is arranged to be suited for controlling braking forces on the wheels of a vehicle relative to each other.

It is a further object of this invention to provide a torque sensing type disc brake which is arranged to be highly suited for antilock control over the wheels of a vehicle.

A feature of a disc brake arranged to attain the above-stated objects of this invention is as follows: The disc brake is of the kind comprising a rotor; a pair of friction pads which are arranged to be capable of frictionally engaging the revolving faces of the rotor; a caliper which is arranged to straddle a portion of the periphery of the rotor and to incorporate therein a piston-cylinder device which is arranged to cause said pair of friction pads to frictionally engage the revolving faces of the rotor; and a support member which carries the caliper in such a way as to be slidable in the axial direction of the rotor and is arranged to receive a braking torque exerted on the friction pads either directly or through the caliper. In this disc brake, the support member is arranged to be carried by and turnable on a pin member which extends in parallel with the axis of the rotor; anchor parts are arranged to restrict the support member from turning round the pin member more than a given degree by engaging the support member; and, further, a turning force detecting means is arranged at least on one of the anchor parts to detect the turning force of the support member.

In accordance with the invented arrangement described, the turning force detecting means which is provided at a part of the anchor parts may be arranged in various manners. For example, a load cell may be arranged as the turning force detecting means to be engaged directly or indirectly with the support member and the output signal of the load cell is used as a turning force detection signal. Otherwise, a piston-cylinder device incorporating a piston which directly or indirectly engages the support member is arranged to be pushed by the turning force of the support member; and the turning force is detected by detecting a hydraulic pressure condition brought about within a hydraulic pressure chamber by the pushing force of the piston.

Another feature of a disc brake arranged according to this invention is as follows: The disc brake comprises a rotor; a pair of friction pads which are arranged to be capable of frictionally engaging the revolving faces of the rotor; and a fixed support which is fixedly arranged in the neighborhood of a portion of the rotor and a caliper which incorporates therein piston-cylinder devices arranged to cause the pair of friction pads to frictionally engage the revolving faces of the rotor on both sides thereof. In this disc brake, the fixed support is arranged to carry the caliper by means of a shaft in such a way as to allow the caliper to be turnable in the circumferential direction of the rotor, the shaft being disposed in parallel with the axis of the rotor; the fixed support is provided with stopper parts for stopping the turning movement of the caliper; and a sensor is provided at least on one of the stopper parts for detecting the turning force of the caliper.

DETAILED DESCRIPTION OF THE PREFERRED EMBODIMENTS

Embodiments of this invention are arranged as described below with reference to the accompanying drawings.

EXAMPLE I

Figure 1:
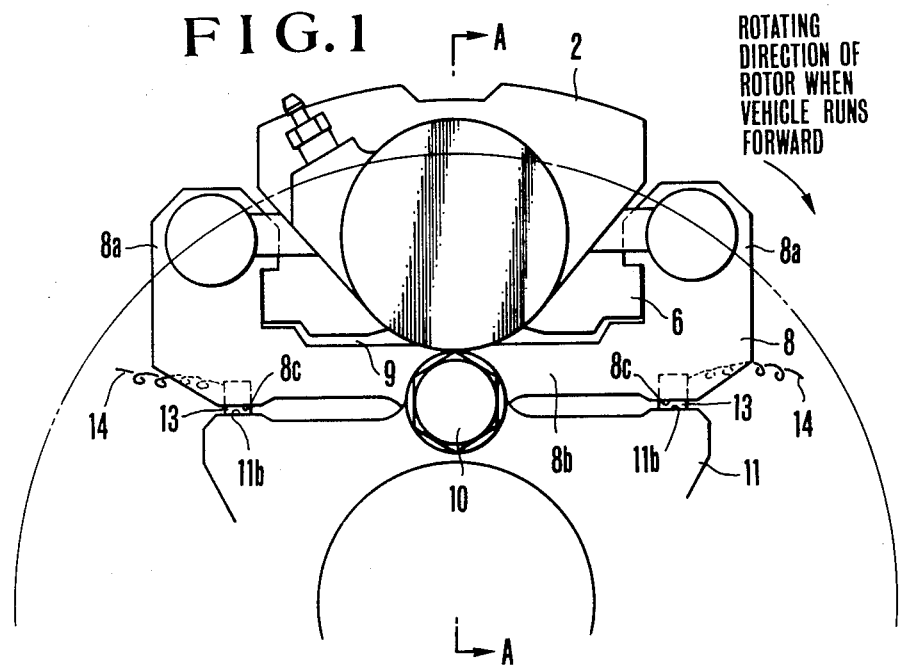
FIG. 1 is a front view showing a disc brake arranged as a first embodiment of this invention.
Figure 2:
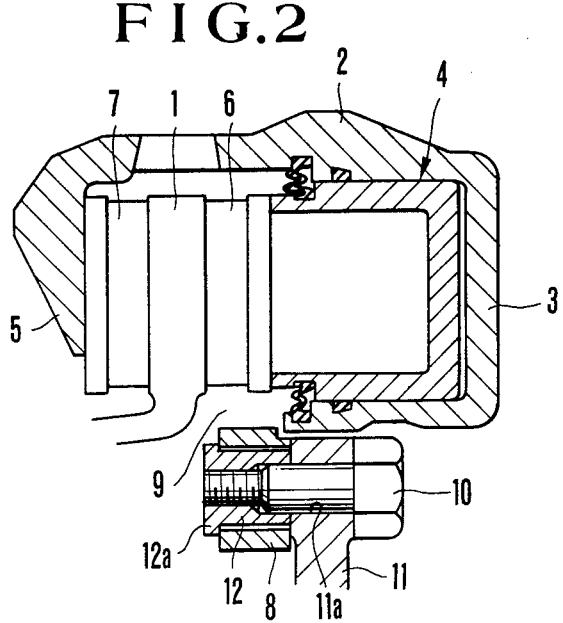
FIG. 2 is a sectional view taken along a line A—A of FIG. 1.

Referring to FIGS. 1 and 2, the illustration includes a rotor 1 and a caliper 2 which are arranged to straddle a portion of the periphery of the rotor 1. Within one leg part 3 of the caliper 2 is provided a piston-cylinder device 4 of the braking hydraulic pressure operating type which is arranged to push a friction pad 6 into frictional engagement with the rotor 1 on one side (inner side) of the rotor. To another leg part 5 of the caliper 2 is secured a friction pad 7 which is disposed on the opposite side of the rotor. The caliper 2 is carried by a support member 8 via a slidably carrying device which is not shown in such a manner that the caliper 2 is slidable in the axial direction of the rotor 1. When the piston-cylinder device 4 operates to push the inner side friction pad 6 against the rotor for frictional engagement, a reaction force resulting from this action causes the caliper 2 to slide inward in the axial direction of the rotor. The sliding motion of the caliper 2 causes the other leg part 5 on the outer side to push the other friction pad 7 against the outer side of the rotor 1 likewise for frictional engagement. With these friction pads brought into contact with the rotor, a braking force develops there.

The above-stated support member 8 is provided with a recess 9 which is formed by machining a flat sheet metal material to open outward in the axial direction of the rotor on one side (inner side) of the rotor. The inner (side) friction pad 6 is carried by the support member 8 within this recess 9 in such a way as to be slidable in the axial direction of the rotor. The support member 8 is provided further with arm parts 8a which are spaced in the circumferential direction of the rotor 1 within the recess 9. The caliper 2 is slidably carried by the fore ends of these arm parts 8a via the slidably carrying device which is not shown.

Further, the support member 8, in this specific embodiment, is arranged in combination with a supporting connection part in the middle part (in the circumferential direction of the rotor) of a bottom part 8b which forms the bottom of the recess 9. This supporting connection part consists of a bolt (or pin member) 10 and a knuckle (or a fixed support) 11. The details of this supporting connection part is as shown in FIG. 2. Referring to FIG. 2, the knuckle 11 is provided with a through hole 11a. The bolt 10 is inserted through the hole 11a. A sleeve like nut member 12 is screwed on the bolt 10. The nut member 12 is provided with a flange 12a. The support member 8 is clamped by the flange 12a and the knuckle 11. The support member 8 is thus arranged to be allowed to turn round the outer circumference of the nut member 12. In other words, the support member 8 is carried by the knuckle 11 in a state of being allowed to turn round on the bolt 10 within a plane which is in parallel with the revolving plane of the rotor 1.

The knuckle 11 is provided with anchor parts 11b. The bottom face 8c of the support member 8 which is approximately in a concave shape is opposed to the knuckle 11 with some clearance left between them by means of the anchor parts 11b on both the rotor entrance side and the rotor exit side of the bottom face 8c. To these anchor parts 11b of the knuckle 11 are secured load cells 13 which engage the support member 8 respectively. The load cells 13 are connected via lead wires 14 to a pressure detecting circuit which is not shown.

The friction pads 6 and 7 come to frictionally engage the rotor upon brake application. Then, when a braking torque acts, the braking torque is transmitted to the support member 8 directly on the inner side thereof and indirectly via the caliper on the outer side. As a result, a turning force develops in the support member 8 around the bolt 10. This turning force is received by the load cell arrangement 13 provided at the anchor parts. The magnitude of the turning force is obtained in the form of an electrical information according to the state of a detection signal obtained from the load cell arrangement 13. The detection information thus obtained is effectively usable in a various manners including, for example: As control information required by a control device for allocation of braking hydraulic pressure to the front and rear wheels of the vehicle; as control information to be fed back to a booster for obtaining a constant braking force from a given pedalling force on the brake pedal; or as control information required for preventing the wheels from falling into a locked state.

EXAMPLE II

Figure 3:
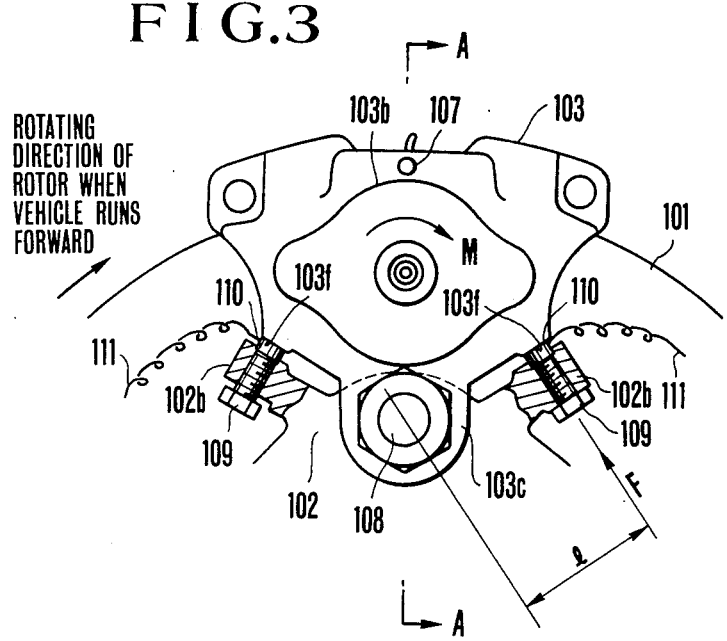
FIG. 3 is a front view showing another disc brake arranged as a second embodiment of this invention.
Figure 4:
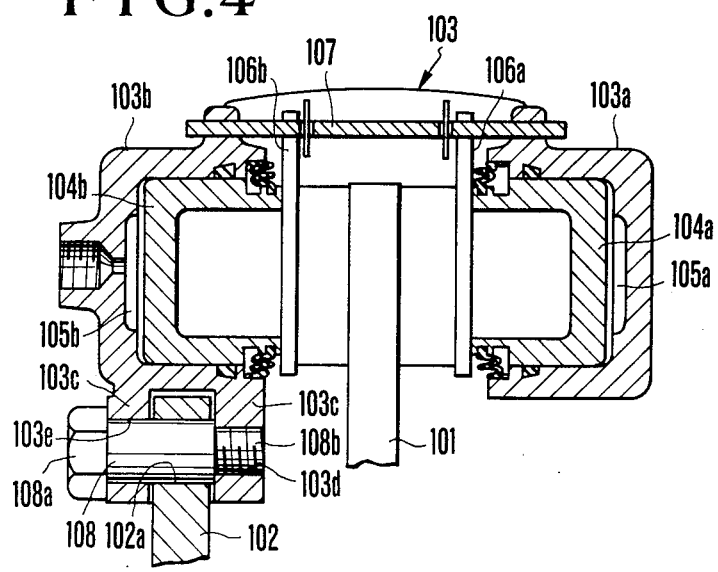
FIG. 4 is a sectional view taken along a line A—A of FIG. 3.

A second embodiment of this invention is arranged as shown in FIGS. 3 and 4. The illustrations include a rotor 101 and a fixed support 102. The fixed support 102 is arranged as a part of a knuckle or the like which is carrying a wheel. In the case of this specific embodiment, the fixed support 102 is provided with a hole 102a which has a rotary support shaft 108 fitted therein on one side of the rotor at an inner part in the direction of the diameter of the rotor. The fixed support 102 further includes stopper parts 102b which are a pair of arm parts extending in the circumferential direction of the rotor on both sides of this hole 102a.

A caliper 103 straddles a portion of the periphery of the rotor 101 and is provided with a pair of piston-cylinder devices 103a and 103b. Pistons 104a and 104b are slidably inserted in the cylinders of these piston-cylinder devices. The piston-cylinder devices 103a and 103b are arranged to cause friction pads 106a and 106b to frictionally engage the rotor 101 on both sides thereof in response to braking hydraulic pressure transmitted to hydraulic pressure chambers 105a and 105b. These friction pads 106a and 106b are carried by the body of the caliper 103 through a pad carrying pin 107 and are movable in the axial direction of the rotor 101.

The caliper 103 is provided with forked supporting extension parts 103c which extend from the inner end part of one of the piston-cylinder devices 103b in the diameter direction of the rotor in such a way as to embrace the part of the fixed support 102 having the hole 102a. In these extension parts 103c are formed a fitting hole 103e and a screw hole 103d which are opposed to each other coaxially with and across the hole 102a of the fixed support 102. The above-stated rotary support shaft 108 is fittingly inserted into these holes 102a, 103d and 103e. The shaft 108 is firmly fixed jointly by the head 108a of the shaft and the screwed engagement of the screwed end part 108b with the screw hole 103d. The caliper 103 is thus arranged to be turnable on this fixed support 102.

In this embodiment, the fixed support 102 is provided with stopper parts 102b. Supporting bolts 109 which are for fixing load cells are screwed to the stopper parts. Load cells 110 are secured to the stopper parts and are arranged to engage the opposed faces of the caliper 103. Lead wires 111 are arranged to produce and supply electrical signals from the load cells 110 to an electronic control circuit which is not shown.

With the disc brake arranged in the manner as described above, when the pair of friction pads 106a and 106b are brought into frictional contact with the rotor 101 by brake application, a braking torque is produced at the friction pads. The braking torque brings about at the caliper 103 a rotational moment M around the shaft 108 according to the rotating direction of the rotor. The moment of rotation M which has developed at the caliper 103 is obtainable from a relation M=F.l as shown in FIG. 3 according to a force F exerted on the load cell 110 (the load cell located on the right-hand side as viewed on FIG. 3). Therefore, the moment M is detected by an electronic control circuit which is not shown as the variation value of an electrical signal produced at the load cell 110. Then, the output condition of the brake is obtained by this detection.

The signal which is obtained in the above-stated manner is, for example, used as information for a feedback system which uses the value of braking hydraulic pressure as another information input and is arranged to give a constant braking force irrespectively of variations in the loaded condition of the vehicle. The signal is usable also for other purposes with a circuit arranged to suit each of such other purposes in accordance with any known applicable technology.

While preferred embodiments have been given in the foregoing, this invention is not limited to them. In the first example, the anchor parts are symmetrically arranged in one unified body on both sides of the support member in the circumferential direction thereof. However, this arrangement may be changed to have them asymmetrically arranged in consideration of a difference which arises in braking torque between forward running and backward running conditions of the vehicle. One of the turning force detecting arrangements may be omitted.

Further, the disc brakes to which this invention is applicable are not limited to the structural arrangement described in the foregoing. For example, both the pair of friction pads may be arranged either to be carried directly by the support member or to be carried by the caliper.

With respect to the second embodiment, one of the load cells located on both sides of FIG. 3 (the one located in the position to be pushed when the vehicle runs backward) may be omitted in cases where the braking torque is to be detected only when the vehicle runs forward. Further, the load cells may be arranged to have a deformable limit set for them for the purpose of preventing them from receiving a pushing force exceeding a predetermined value.

In the torque sensing type disc brake which is arranged as described in the foregoing, the magnitude of the braking torque which is obtained at the caliper during brake application is taken out in the form of an electrical signal from a transducer such as a load cell or the like. Then, the signal thus obtained can be used as an input signal to a desired control system according to the purpose of the application. The accuracy of the correlativity of the above-stated signal taken out as a braking torque detection signal with the actual braking torque is high. Besides, the signal has a high degree of reproducibility and reliability. The invention, therefore, has great utility.

What is claimed is:

1. A disk brake comprising a rotor having an axis, a pair of oppositely facing revolving faces facing in the axial direction of said rotor and a radially outer circumferential periphery, a caliper straddling a portion of the outer circumferential periphery of said rotor and including therein a piston-cylinder device, a pair of friction pads mounted on said caliper each on an opposite side of said rotor facing one of said revolving faces, with said piston-cylinder device arranged to cause said pair of friction pads to frictionally engage the revolving faces of said rotor, and a support member supporting said caliper so that said caliper is slidable in the axial direction of said rotor and said support member receives a braking torque developed by said friction pads one of directly and through said caliper, comprising:

a fixed support, said support member supported on said fixed support, a pin member having an axis parallel with the axis of said rotor connects said support member to said fixed support so that said support member is turnable about the axis of said pin member, said fixed support includes anchor parts spaced transversely of the axial direction of said pin member outwardly from said pin member, said anchor parts engage said support member for limiting the degree said support member is turned on said pin member; and turning force detecting means located on at least one of said anchor parts for detecting the turning force of said support member, and said turning force detecting means includes a transducer for detecting the magnitude of the turning force as an electrical signal.

2. A disk brake according to claim 1, wherein said fixed support has a through hole extending in the axial direction of said rotor, said pin member comprises a bolt and a flanged nut member, said bolt extends through said through hole and clamps said support member to said fixed support so that said support member is turnable between said fixed support and the flange part of said nut member.

3. A disk brake according to claim 1, wherein said detecting means comprises a load cell secured to said anchor part and arranged to contact said support member.

4. A disk brake comprising a rotor having an axis, a pair of oppositely facing revolving faces facing in the axial direction of said rotor and a radially outer circumferential periphery, a caliper incorporating piston-cylinder devices therein, a pair of friction pads mounted in said caliper for frictionally engaging the revolving faces of said rotor when displaced by said piston-cylinder devices, a fixed support located adjacent said rotor, a shaft extending through said fixed support and connecting said caliper to said fixed support, said shaft being parallel with the axis of said rotor, stopper parts located on said fixed support spaced outwardly from said shaft transversely of the axial direction of said rotor, said stopper parts arranged to stop the turning movement of said caliper in the circumferential direction of said rotor, a sensor locatted on at least one of said stopper parts for detecting the turning force of said caliper, and said sensor includes a transducer for detecting the magnitude of the turning force as an electrical signal.

5. A disk brake according to claim 4, wherein one of said piston-cylinder devices of said caliper comprises a pair of forked arms extending toward and fitting over said fixed support, said forked arms each having an opening therethrough with said shaft extending through the opening in said forked arms and said fixed support, so that said forked arms turnably support said caliper on said fixed support.

6. A disk brake according to claim 4, wherein said sensor comprises a load cell.

* * * * *